United States Patent [19]

Engelmore

[11] Patent Number: 4,590,337
[45] Date of Patent: May 20, 1986

[54] ROTATABLE ELECTRICAL CONNECTOR FOR COILED TELEPHONE CORDS

[76] Inventor: Anthony R. Engelmore, 14001 Harbour Pl., Prospect, Ky. 40059

[21] Appl. No.: 676,031

[22] Filed: Nov. 28, 1984

[51] Int. Cl.⁴ .................. H04R 1/06; H01R 39/00; H02G 11/00
[52] U.S. Cl. ..................... 179/186; 179/178; 191/12 R; 339/8 R; 339/5 R; 339/6 R
[58] Field of Search ............ 179/184, 186, 178, 154; 191/12 R, 12 S; 339/5 R, 5 M, 5 RL, 8 R, 8 RL, 6 R, 6 RL

[56] References Cited

U.S. PATENT DOCUMENTS

| | | | |
|---|---|---|---|
| 3,195,094 | 7/1965 | Mohr | 339/8 PB |
| 3,599,165 | 8/1971 | Wendell et al. | 191/12 R |
| 3,699,498 | 10/1982 | Hardesty et al. | 179/178 |
| 3,847,463 | 11/1974 | Hayward et al. | 339/8 P |
| 3,972,577 | 8/1976 | Charles et al. | 339/8 L |
| 4,296,991 | 10/1971 | Hughes et al. | 179/178 |
| 4,472,010 | 9/1984 | Parnello | 339/8 R |

Primary Examiner—Gene Z. Rubinson
Assistant Examiner—Danita R. Byrd
Attorney, Agent, or Firm—Richard L. Caslin

[57] ABSTRACT

This low friction rotatable electrical connector is for use with coiled telephone cords to prevent the cord from becoming twisted and knotted-up during use. This connector is generally of insulating material formed with a hollow housing having a first electrical female socket built into one end wall, and a circular opening in the opposite end wall for supporting a rotor assembly that is also of insulating material. The free end of the rotor assembly has a male phone plug. The innermost end of the rotor assembly has an enlarged head with a transverse face supporting a plurality of concentric electrical contact rings that are insulated from each other. A circuit board is clamped within the housing, and it has a first plurality of spring wire contacts that are each urged into continuous wiping contact with a separate one of the concentric rings. A second plurality of spring wire contacts are mounted to the circuit board within the female socket for making contact with a standard male phone plug. The housing is provided with partitions to provide spacers between the first plurality of spring wires and separate partitions for providing spacers between the second plurality of spring wires so as to retain these contact elements in place. The location of this rotatable connector relative to the coiled telephone cord has many possibilities. The connector can be at either end of the cord, or intermediate the length of the cord, or built into the handset.

22 Claims, 12 Drawing Figures

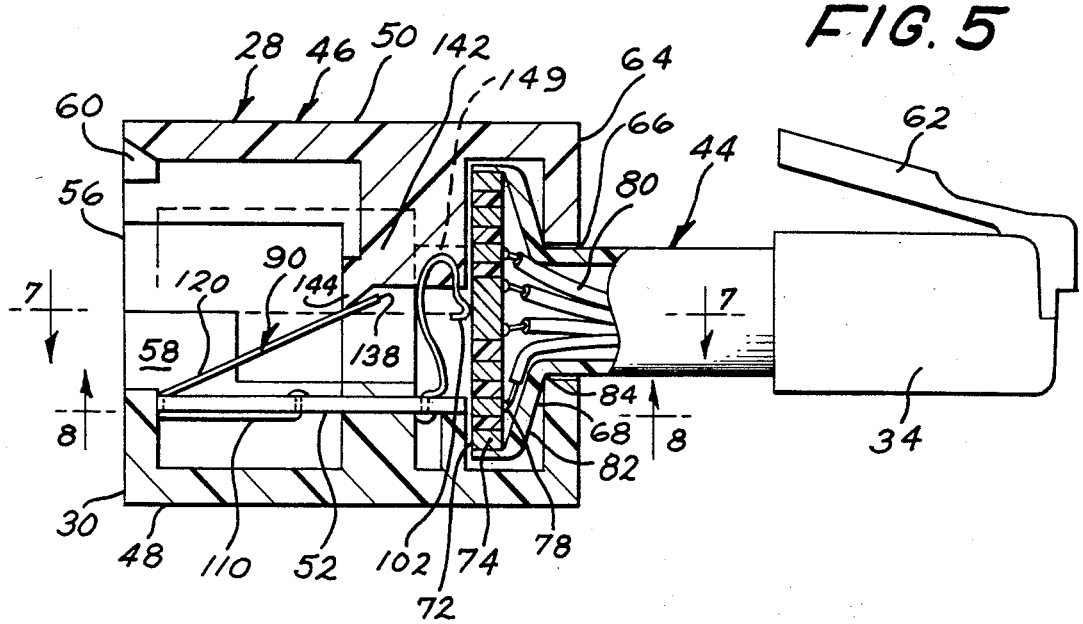
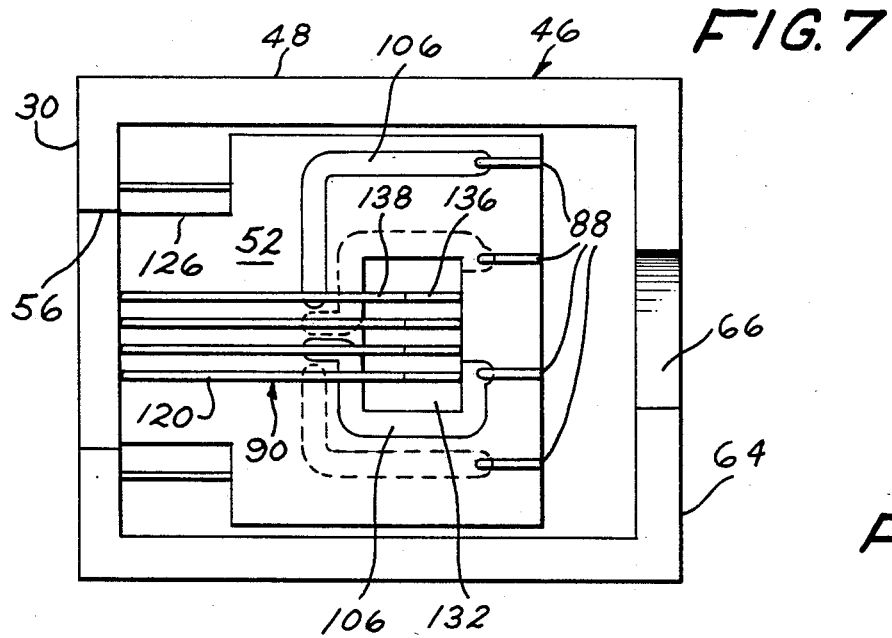
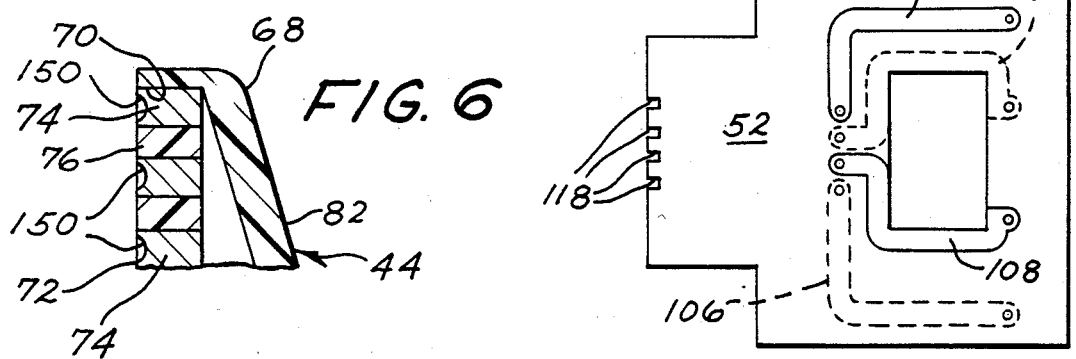
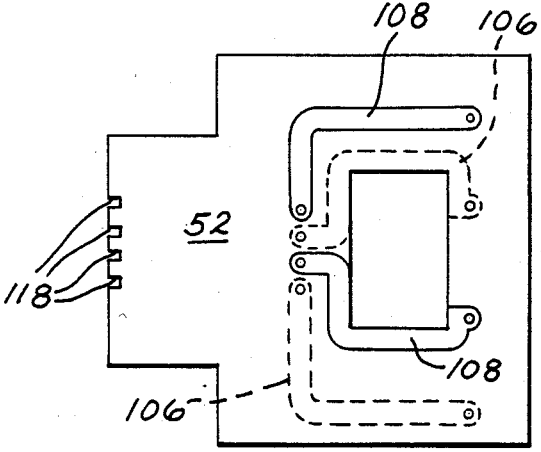

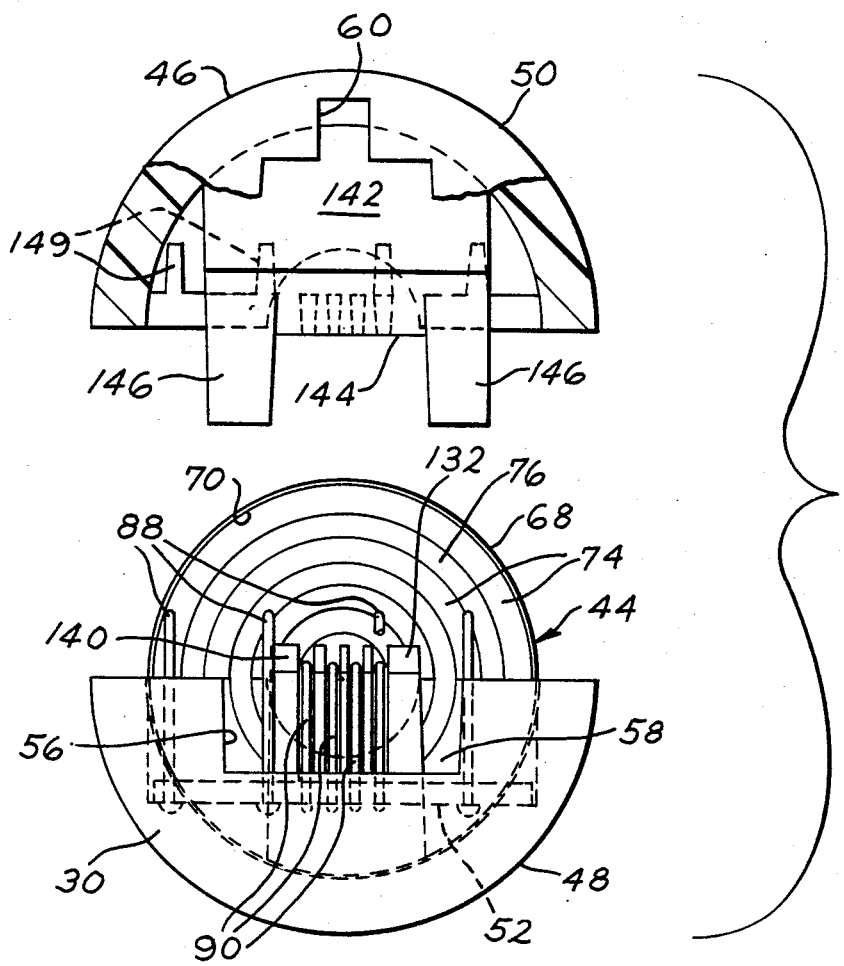
FIG. 9
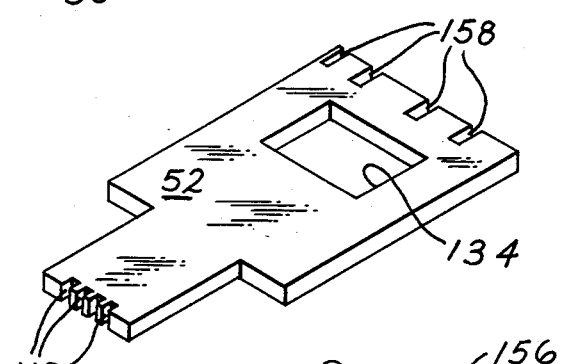
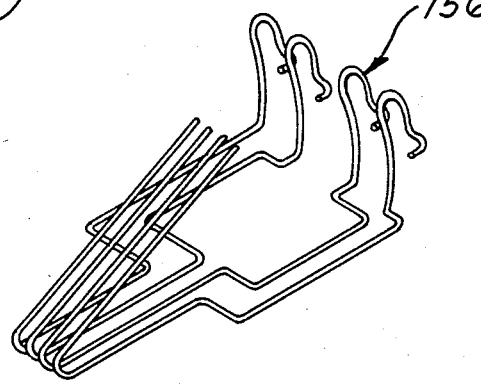
FIG. 10

ROTATABLE ELECTRICAL CONNECTOR FOR COILED TELEPHONE CORDS

BACKGROUND OF THE INVENTION

1. Field of the Invention:

This invention relates to the art of rotatable electrical connectors for use with flexible electric cables, and particularly for use with coiled cords that are widely used today on telephone receivers for connecting the handset to the telephone base. One of the advantages of coiled telephone cords is that they are able to stretch for convenient use, while they retract into a compact length when not in use. This rotatable connector of the present invention is mainly for use with lightweight, light-duty telephone cords rather than high voltage, high current electrical cable systems.

2. Description of the Prior Art:

A thorough search of the prior art was made, and no patents were found relating to rotatable electrical connectors for coiled telephone cords. Most, if not all, of the prior art described heavy-duty commercial or industrial electrical connectors, which will now be described.

The Mohr U.S. Pat. No. 3,195,094 relates to an electric cable coupling comprising mutually concentric, rotatable units that are capable of transmitting electrical current therethrough. Each electrical circuit has an internal ring member surrounded by a plurality of cylindrical rollers which are confined by an external ring member, and this unit is held together by split rings or helical springs. This design appears to have an excessive amount of friction to restrain an easy turning action between the movable parts.

The Norwegian Pat. No. 106,382, issued in 1965, appears to be derived from the above-cited Mohr patent, or vice versa.

The German Pat. No. 1,152,459 describes a cable connector with mutually concentric and rotatable parts for polyphase current in which a series of ball bearings is provided inside an insulating housing. These ball bearings are under spring pressure, and they carry the electrical current. An internal tube is provided which holds a compact bundle of conductors that reach inside the insulating housing. The number of conductors corresponds to the number of electrical phases.

The Wendell et al U.S. Pat. No. 3,599,165 describes an electrical coupling device providing a series of continuous, unbroken, unsliding electrical connections between two relatively rotatable members over a limited angular displacement. There is a spiral strip connector that is made of thin material having a relatively low spring constant that is capable of cyclic operation for a sufficient large number of rotative displacements as desired without excessive fatigue and rupture.

The Hayward et al U.S. Pat. No. 3,847,463 describes a cable connector for electrically connecting a coaxial cable to a fixed device, such as a coupler or amplifier, for use in a cable antenna television system CATV which is adapted to accommodate drop leads to individual subscribers' television sets.

The Charles et al U.S. Pat. No. 3,972,577 describes rotating electrical contacts in a device that is intended to be used on apparatus submerged underwater at great depth where it would be subjected to a high hydrostatic pressure. One example of such a device would be a rotary antenna of panoramic sonars intended to operate at great depth. This device also must be watertight. This patent uses mercury or an alloy of gallium and indium as the conductive liquid.

The British Pat. No. 331,997 describes swivel connections for electric cables using ball bearing rings. One metal ring has spring wipe contacts that are adapted to press lightly on the face of the opposite ring and provide continuous electric contact therebetween. Apparently, the ball race is not an electrical conductor. There is a ball and socket joint between the spindle of one member and the spindle of the opposite member.

OBJECTS OF THE PRESENT INVENTION

The principal object of the present invention is to provide a low friction rotatable electrical connector for use with coiled telephone cords so as to prevent the cord from becoming twisted and knotted-up.

A further object of the present invention is to provide a rotatable connector of the class described having a longitudinally split hollow housing having a circular opening at one end for receiving a rotor assembly with a parallel array of spring wire contact elements cooperating with a plurality of concentric electrical contact rings on the inner face of the rotor assembly for maintaining electrical continuity through the connector at all times.

A further object of the present invention is to provide a rotatable electrical connector of the class described with partitions for stabilizing and spacing the spring wire contact elements apart.

A further object of the present invention is to provide a rotatable electrical connector of the class described with a female electrical socket built into one end of the connector housing and a male phone plug assembled on the free end of the rotor assembly.

A further object of the present invention is to provide a rotatable electrical connector of the class described with a circuit board means clamped within the housing for supporting a first plurality of spring wire contact elements that make a continuous wiping contact with the plurality of concentric electrical contact rings, as well as supporting a second plurality of spring wire contact elements that serve as terminal means of the female socket for receiving a male phone plug.

SUMMARY OF THE INVENTION

The present invention provides a low friction rotatable electrical connector for use with coiled telephone cords, where the connector has a hollow housing with a first plurality of electrical terminal means at one end and a circular opening in the end wall at the opposite end of the housing for supporting a rotor assembly to rotate freely relative to the connector housing, there being a second plurality of electrical terminal means associated with the rotor assembly. The inner end of the rotor assembly has a transverse face supporting a plurality of concentric electrical contact rings, where each ring is connected to a separate one of the second plurality of electrical terminal means. A plurality of spring wire contact elements is mounted within the housing in a parallel array, where each spring wire contact element has a portion biased into continuous wiping contact with a separate one of the concentric rings. The housing includes partitions between adjacent spring wire contact elements for stabilizing them and separating them apart.

BRIEF DESCRIPTION OF THE DRAWINGS

This invention will be better understood from the following description taken in conjunction with the accompanying drawings, and its scope will be pointed out in the appended claims.

FIG. 5 is a cross-sectional elevational view of the rotatable electrical connector of the present invention showing the parts completely assembled together with the longitudinally split insulating housing having the female electrical socket at the left end and the male phone plug mounted on the free end of the rotor assembly.

FIG. 6 is a fragmentary cross-sectional view through the enlarged head of the inner end of the rotor assembly that is drawn to illustrate the shallow groove formed in the surface of each concentric electrical contact ring to serve as a track for receiving the mating surface of the spring wire contact element.

FIG. 7 is a top plan view, on an enlarged scale, of the base portion of the housing with the rotor assembly removed, but the circuit board in place along with its first plurality of spring wire contact elements at the right side for engagement with the concentric electrical contact rings of the rotor assembly, as well as the second plurality of spring wire contact elements at the opposite end of the circuit board for use in the female electrical socket for engagement with the contacts of a male phone plug.

FIG. 8 is a bottom plan view of the circuit board of FIG. 7 showing the printed circuit elements which are present on the underside of the circuit board as compared with those that are present on the top side of the circuit board.

FIG. 9 is an exploded left end view of the connector housing with the circuit board and rotor assembly in place, and the raised cover portion partly in cross section to show some of its details of construction.

FIG. 10 is a fragmentary exploded perspective view of a second modification of the present invention, where the circuit board is designed to support a single plurality of spring wire contact elements which perform the same function as the two pluralities of spring wire contact elements of FIGS. 5-9.

DESCRIPTION OF THE PREFERRED EMBODIMENTS

Figure 1:
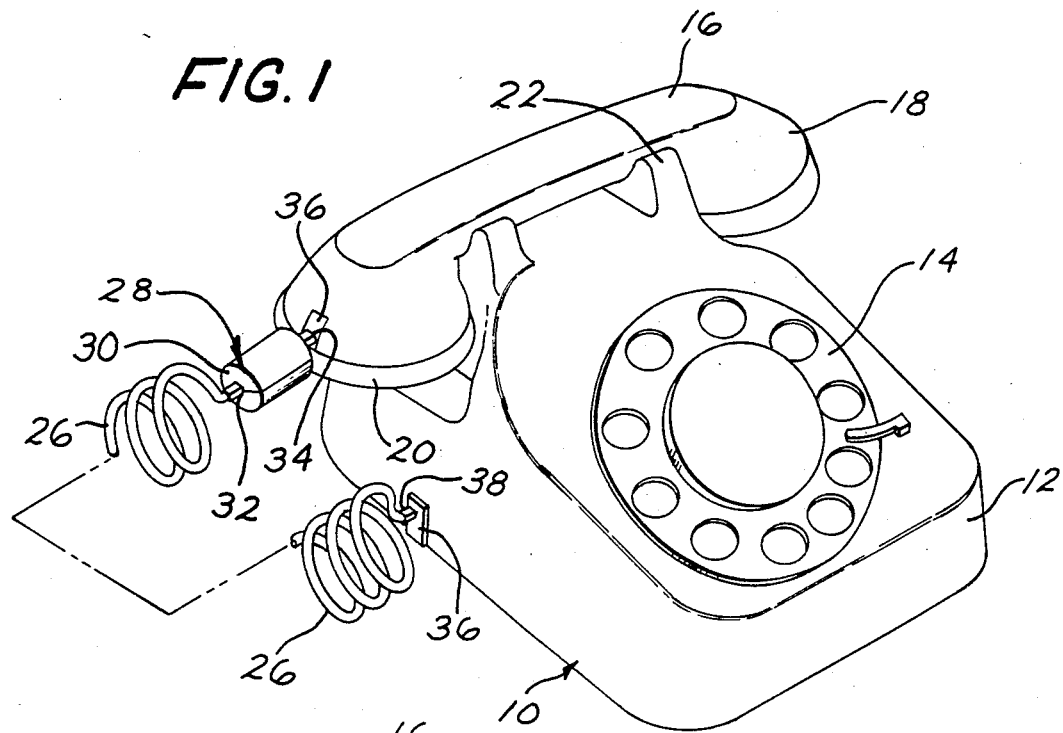
FIG. 1 is a top perspective view of a standard telephone set provided with a coiled telephone cord between the base and the handset, where the low friction rotatable electrical connector of the present invention is interposed between one end of the coiled telephone cord and the handset.

Turning now to a consideration of the drawings, and, in particular, to the top perspective view of FIG. 1, there is shown a typical example of a telephone set 10 as for use on a table or desk top. This telephone set 10 has a base 12 which includes the dialing mechanism 14. Separate from the base is a handset 16 which, of course, has the earpiece 18 at one end and a microphone 20 at the opposite end. This handset 16 is shown resting in a cradle 22 when it is not in use. Of course, this is only one configuration of a standard telephone set, and it is well recognized that there are many variations of this configuration and that the number of such configurations are growing rapidly, but most of them have the relationship of a fixed base element and a movable handset. The handset 16 is joined electrically to the base 12 by means of a coiled telephone cord 26, as is conventional in this art, because they are compact when the handset 16 is at rest in its cradle 22, and it is capable of stretching to several times its normal length for the convenience of the user in moving the handset 16 away from the base unit 12. One frequently heard complaint in the use of coiled telephone cords, such as 26, is that they become twisted and knotted-up during normal use until they reach a condition where they will not expand or stretch as originally designed, and then such cords become an annoyance rather than a convenience.

The present invention relates to the discovery of several modifications of a low friction rotatable electrical connector 28 for cooperation with the coiled telephone cord 26 to ensure that the movement of the handset 16 away from the base 12 will not cause a kink or twist to occur in the coiled telephone cord 26. In FIG. 1, the rotatable electrical connector 28 of the present invention is connected at one end 30 of the connector to a standard male phone plug 32 that is formed at one end of the coiled cord 26. The opposite end of the connector 28 is fitted with a standard male phone plug 34 which is mounted into a standard female receptacle 36 built into the microphone end 20 of the handset 16. Notice, the opposite end of the coiled telephone cord 26 also has a standard male phone plug 38 which connects into a standard female receptacle 36.

Figure 2:
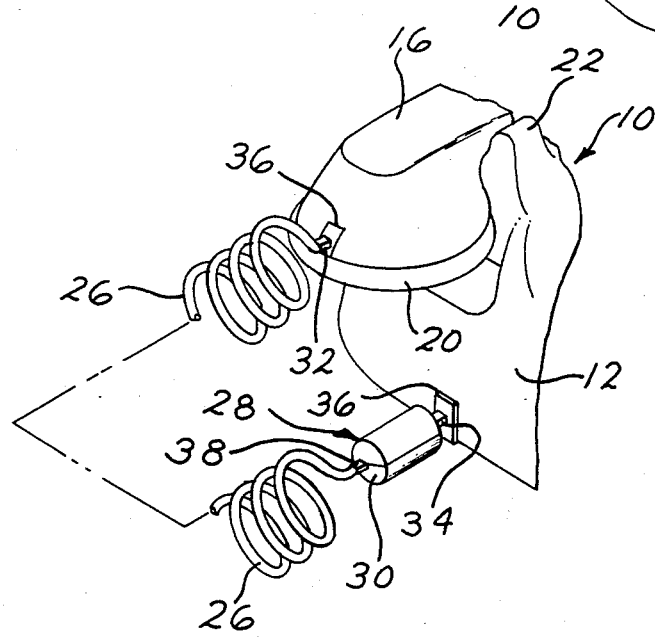
FIG. 2 is a fragmentary perspective view, similar to a portion of FIG. 1, showing the rotatable electrical connector of the present invention plugged into the base of the telephone set, while the lower end of the coiled telephone cord is plugged into the other end of the connector housing.

Before going into a detailed description of the construction of this rotatable electrical connector 28, mention will be made of other possible locations for the connector, starting with FIG. 2. The same elements shown in FIG. 2 will be given the same reference numerals as appear in FIG. 1 for those elements. In the modification of FIG. 2, the rotatable electrical connector 28 has its standard male phone plug 34 at one end connected into a standard female receptacle 36 in the base 12 of the phone, and the other end 30 of the connector receives a standard male phone plug 38 on the adjacent end of the coiled telephone cord 26. Notice, the opposite end of the cord 26 has its standard male phone plug 32 connected into the standard female receptacle 36 in the microphone end 20 of the handset 16. Thus, the connector 28 is merely connected into the base 12 rather than into the handset 16, as in FIG. 1.

Figure 3:
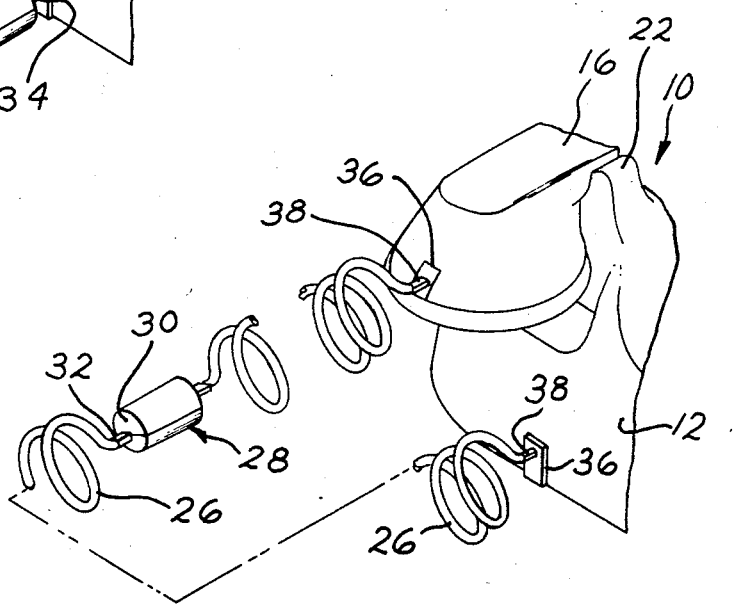
FIG. 3 is a fragmentary perspective view, similar to that of FIG. 2, showing the rotatable electrical connector of the present invention mounted intermediate the length of the telephone cord.

In the third modification of FIG. 3, the rotatable electrical connector 28 of the present invention is shown mounted intermediate the length of the telephone cord 26 rather than to the handset 16, as in FIG. 1, or connected into the base, as in FIG. 2. In FIG. 3, the length of coiled cord 26 between the connector 28 and the handset 16 could be furnished with a female socket (not shown) at the left end for receiving a standard male phone plug 34 on the adjacent end of the connector 28, or that left end of the cord could be connected permanently into the connector 28 when the connector was constructed as original equipment.

Figure 12:
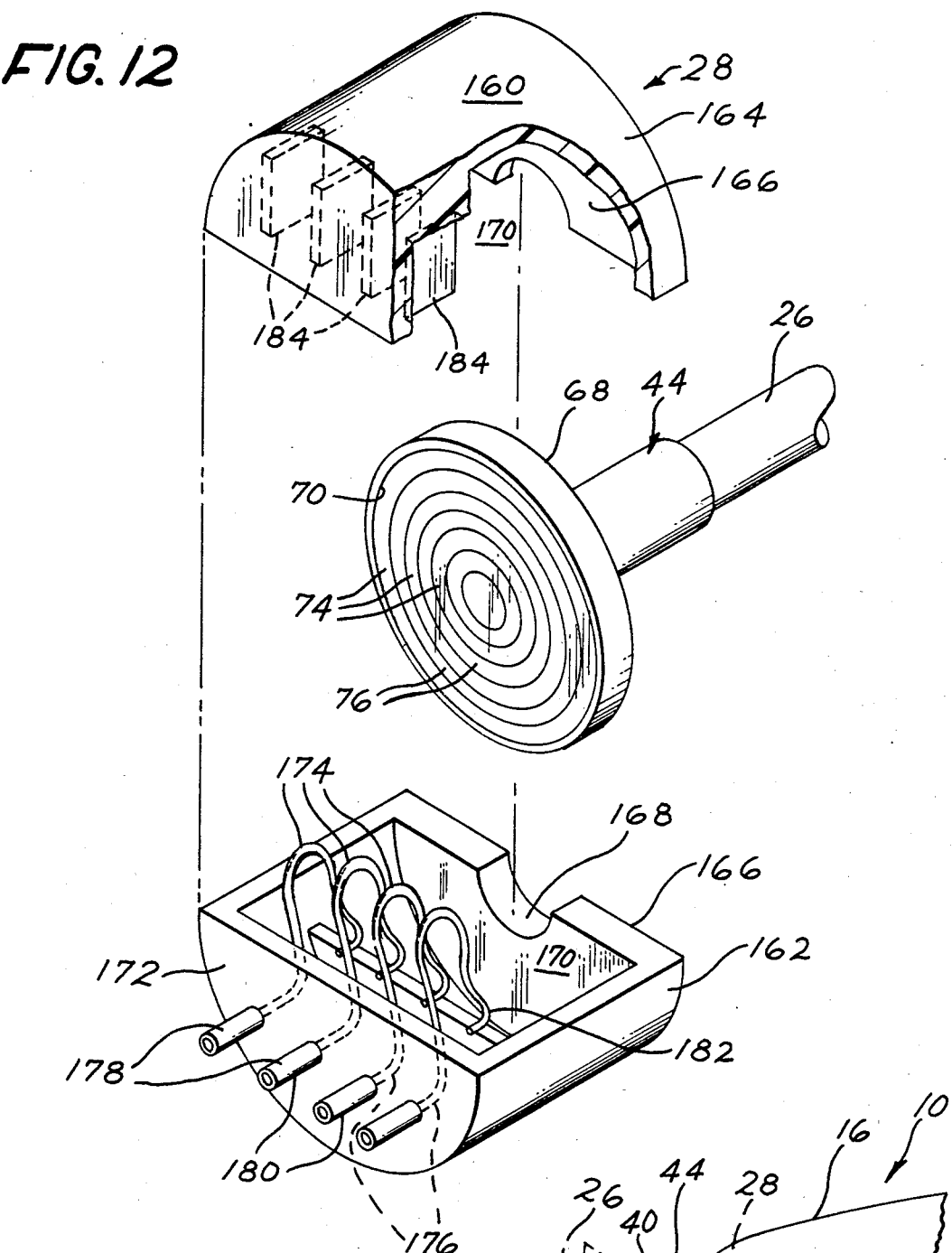
FIG. 12 is a fragmentary exploded view of a third modification of the present invention which is related to the rotatable electrical connector of FIG. 11 which is built into the handset where the coiled telephone cord is attached to the outer end of the rotor assembly and the circuit board has been eliminated by mounting the plurality of spring wire contact elements directly to the base portion of the connector housing.
Figure 11:
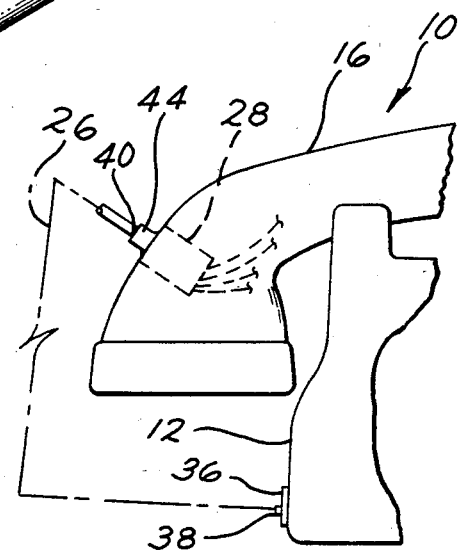
FIG. 11 is a fragmentary front elevational view of the telephone set of FIG. 1 showing the rotatable electrical connector of the present invention built into the handset, where the telephone cord either plugs into the connector or is permanently fixed to one of the rotatable portions of the connector.

In the fourth modification of FIG. 11, the rotatable electrical connector 28 of the present invention is built into the microphone end of the handset 16, and the upper end 40 of the coiled cord 26 is connected permanently into the rotor assembly 44 of the connector 28, as will best be understood during the explanation of FIG. 12.

Figure 4:
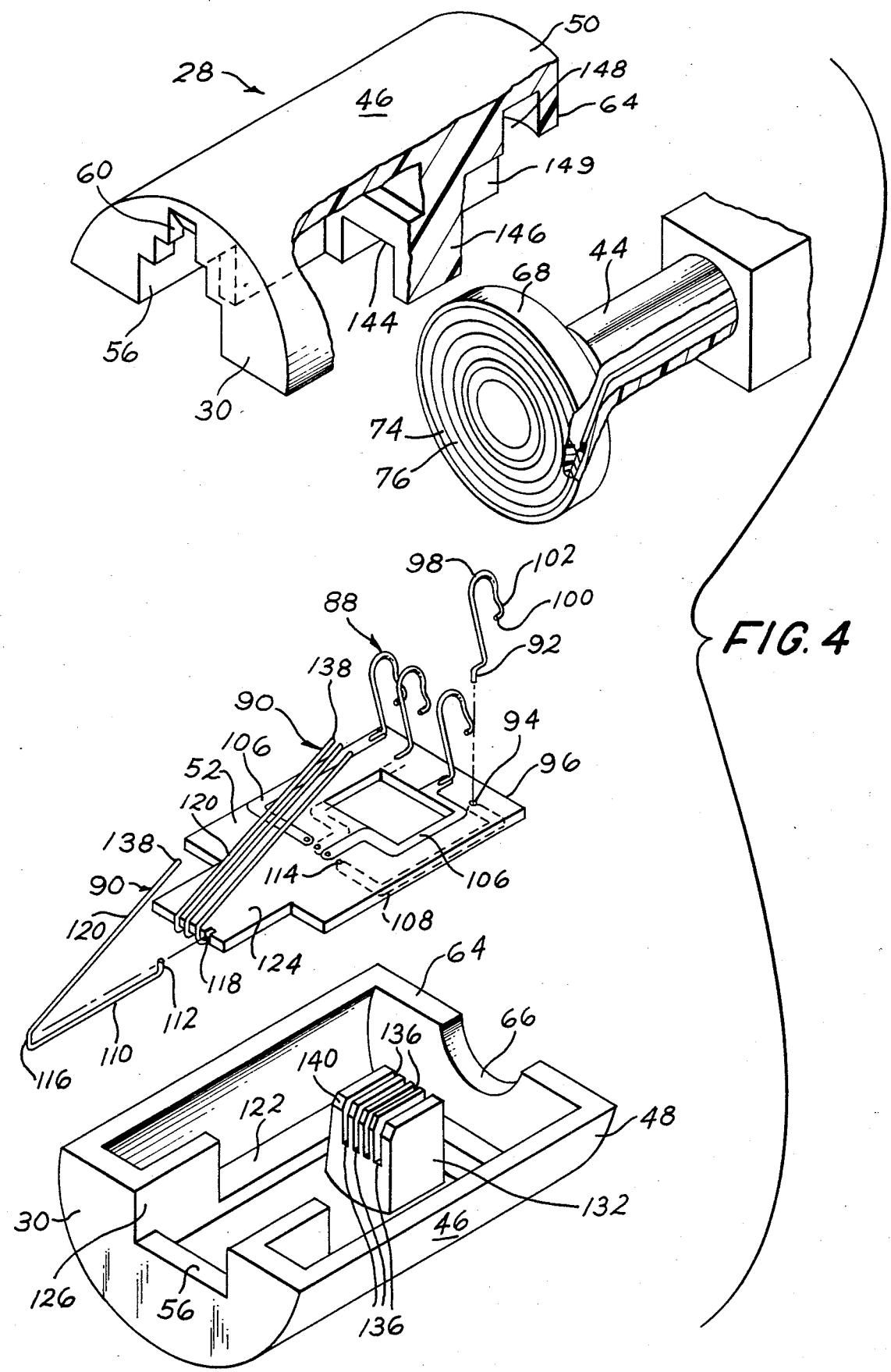
FIG. 4 is an exploded perspective view, on an enlarged scale, showing the low friction rotatable electrical connector of the present invention separated into its individual parts and arranged in the manner in which they are joined together, where the hollow cover member is illustrated at the top of the Figure, the rotor assembly is shown just below the cover, then the circuit board is shown supporting a first plurality of spring wire contact elements at one end, as well as supporting a second plurality of spring wire contact elements at the opposite end, and finally the hollow base member is shown at the bottom of the Figure.

The construction and operation of this low friction rotatable electrical connector 28 of the present invention can best be understood from the exploded perspective view of FIG. 4. There are four main elements; namely, a hollow housing 46 of insulating material which is molded of Delrin or Teflon, or some equivalent self-lubricating type thermoplastic material. This hollow housing 46 is split longitudinally into a lower base portion 48 and an upper cover portion 50; although it will be understood that these parts are only upper and lower depending upon the orientation of the parts. In the drawing, they have been positioned so that one-half of the housing is a base and the other half is a top cover for purposes of clarification. Cooperating with the hollow housing 46 is the rotor assembly 44 to be in relative rotation therewith. The fourth main element of the connector 28 is a circuit board 52 for supporting the internal circuit elements, as will be explained shortly.

The operation of this rotatable electrical connector 28 can best be understood in the assembled view of FIG. 5, which is partly in cross section in a front elevational view. The same elements described in FIG. 4 that are illustrated in FIG. 5 will be identified by the same reference numerals. The hollow insulating housing 46 is of cylindrical form, having one end 30 provided with a rectangular opening 56 which leads into a female socket 58 for receiving a standard male phone plug 32, as illustrated in FIG. 1. The upper edge of the rectangular opening 56 includes an indexing slot 60, as best seen in FIG. 4, that is adapted to receive the finger operated locking means 62, which is illustrated at the right side of FIG. 5, as part of the standard male phone plug 34 which is assembled on the free end of the rotor assembly 44. Of course, this male phone plug 34 is not the one that fits into the female socket 58 at the other end of the housing 46. This male plug 34 is merely representative of a standard male phone plug of the type that would mate into the female socket 58 at the other end of the housing.

The opposite end of the housing 46 has an end wall 64 with a central circular opening 66 for receiving the rotor assembly therethrough, where this circular opening 66 serves as a bearing in which the rotor assembly is supported and is designed to rotate freely relative to the connector housing 46. The rotor assembly 44 is molded of a thermoplastic material, such as Delrin or Teflon or other compatible material, to the insulating material of the hollow housing 46. The rotor assembly 44 is also of a hollow material having an enlarged head 68 at its innermost end. The innermost end of the enlarged head 68 has a circular opening 70 which is closed by a wafer 72 that is formed by a plurality of concentric electrical contact rings 74 which are spaced apart by rings of electrical insulation 76. Thus, the innermost end of the rotor assembly 44 has a transverse face presenting a plurality of concentric electrical contact rings 74, which are four rings in number, which are spaced apart by a series of three rings of insulation 76, as is best seen in FIG. 4. Each contact ring 74 is fitted with a tab terminal 78 on its unexposed side to which is soldered an insulated conductor 80 which extends through the hollow rotor assembly 44 for connection to the circuit elements within the standard male phone plug 34, as seen in FIG. 5. The rear face 82 of the enlarged head 68 of the rotor assembly 44 is furnished with a thrust bearing surface 84 which acts against the innermost peripheral edge of the circular opening 66 in the end wall 64 of the housing 46 to retard the removal of the rotor assembly 44 from the housing 46 and serve as the only bearing surfaces between the rotor and housing.

Turning back to a consideration of the exploded perspective view of FIG. 4, the circuit board 52 is also of insulating material, and it is fitted with a first plurality of spring wire contact elements 88 at one end of the board adjacent the plurality of concentric electrical contact rings 74, and a second plurality of spring wire contact elements 90 at the opposite end of the board so as to be disposed within the female socket 58 and being in a position to automatically engage with the circuit elements carried by a mating standard male phone plug when it is coupled in the female socket. The first plurality of spring wire contacts 88 is arranged in a parallel vertical array, as viewed in FIG. 4. Each spring wire contact 88 is identical, and it has a fixed terminal end 92 at one end that is inserted into a mating hole 94 adjacent the edge 96 of the circuit board 52. The intermediate portion of each spring wire contact 88 is formed in a hairpin shape 98, while the other end 100 of the spring wire contact terminates at about mid-height of the spring wire contact, and it is fitted with a smooth convex wiping surface 102 that will be positioned in engagement with a separate one of the plurality of concentric electrical contact rings 74. As shown in FIGS. 4 and 5, the wiping contact action between each convex surface 102 and a separate one of the four concentric rings 74 takes place generally on an imaginary diametrical line that passes through the longitudinal centerline of the wafer 72. The longitudinal centerline represents the turning axis of the rotor assembly.

The circuit board 52 is provided with a plurality of printed circuit elements 106 and 108, where each printed element is connected to a separate one of the first plurality of spring wire contact elements 88. There are two printed circuit elements 106 on the top side of the circuit board 52, and two printed circuit elements 108 on the bottom side, as is clear from FIGS. 4, 7 and 8.

The second plurality of spring wire contact elements 90 is generally V-shaped, as seen in a side view looking along the plane of the circuit board 52, as best seen in FIG. 5. The lower leg 110 of the spring wire contact 90 is positioned horizontally against the underside of the circuit board 52, and its free end 112 is turned up slightly to form a vertical terminal that is adapted to fit into a mating hole 114 and soldered in place, as seen in FIG. 4. Notice that the printed circuit elements 106 and 108 each have a mating hole 114 at one end and a mating hole 94 at its opposite end for completing the circuit between the first and the second plurality of spring wire contacts 88 and 90. The apex 116 of the V-shaped spring wire contact 90 is adapted to slip into a shallow notch 118 formed in the edge of the end of the circuit board 52 to help to retain and stabilize this spring wire contact 90. The upper leg 120 of the V-shaped spring wire contact 90 is formed at an acute inclined angle of about 25 degrees, and it is longer than the lower leg 110. This second plurality of spring wire contact elements 90 is likewise arranged in a vertical parallel array, but they are closer spaced than the spring wire contacts 88 of the first plurality.

The hollow insulated housing 46 of this rotatable connector 28 is generally a circular cylindrical member that is split longitudinally on its center longitudinal axis to form the lower base portion 48 and the upper cover portion 50, as is best seen in FIG. 4. Thus, one-half of the rectangular opening 56 is in the base portion 48, and the other half is in the cover portion 50. The same is true of the circular opening 66. One-half of it is in the base portion 48, and the other half is in the cover portion 50. Opposite side ledges 122 are formed near the base of the bottom portion 48, and these serve as support ledges for the opposite side edges of the circuit board 52. The circuit board has a tongue portion 124 at one end, which is more narrow than the normal width of the circuit board, to slip down between the opposite vertical sidewalls 126 of the rectangular opening 56. Actually, the top surface of the circuit board 52 is flush with the bottom wall of the rectangular opening 56, as is best seen in FIG. 5.

The base portion 48 has a central vertical post 132 that is rectangular in plan view. Similarly, the circuit board 52 has a rectangular opening 134, as seen in FIG. 10, so that this opening may be aligned with the post 132 so the circuit board may thereby be indexed on the post until the board is seated upon the opposite support ledges 122 in the base portion. Thus, this interaction between the post 132 and this opening 134 in the circuit board serves as a precision method of locating the circuit board relative to the housing 46 and the rotor assembly 44. Four narrow, deep slots 136 are cut vertically in the top end of the post 132, each slot for receiving the free end 138 of the inclined upper leg 120 of the spring wire contact element 90 for retaining and spacing these spring wire contacts and increasing the life expectancy of this rotatable electrical connector. Notice, in FIG. 4, one edge 140 of the top of the vertical post 132 is ground off at an inclined angle. Now, turning to FIG. 5, the upper cover portion 50 of the housing is provided with a solid section 142 which has a complementary wedge-shaped tip 144 which mates with this inclined top edge 140 of the vertical post 132, as is best seen in FIG. 5. The solid section 142 includes a pair of parallel vertical partitions 146 which are adapted to be located on the opposite sides of the vertical post 132 when the cover 50 is assembled on the base 48, as is clear from FIG. 9. The height of these partitions 146 is such that these partitions bear down on the top surface of the circuit board 52 for holding the circuit board firmly in place in final assembly. Now, looking at FIGS. 4 and 5, it is clear that there is a compartment 148 formed on the right end of the housing 46 between the end wall 64 and the solid section 142 of the cover portion 50. This compartment is for receiving the enlarged head 68 of the rotor assembly 44. In addition, this solid section 142 includes a series of parallel vertical slots 149, as is best seen in FIG. 9, for receiving the top portions 98 of the individual spring wire contact elements 88 for retaining each spring wire contact element in place, as well as to stabilize it to ensure long life expectancy and reliability of function.

Notice in FIG. 5 that the smooth convex wiping surface 102 of the spring wire contact element 82 protrudes into the compartment 148, as identified in FIG. 4, that is formed between the end wall 64 and the solid section 142. This solid section 142 also serves as a limit means that limits the amount the rotor assembly 44 may move or telescope into the hollow housing 46 so as to protect the first spring wire contact elements 88 from over-compression.

As stated earlier, FIG. 6 is a fragmentary cross-sectional view, on an enlarged scale, through the enlarged head 68 on the inner end of the rotor assembly 44 that has been presented to illustrate a shallow groove 150 that is formed in the contact face of each concentric electrical contact ring 74 to serve as a track for receiving the smooth convex wiping surface 102 at the free end of the first plurality of spring wire contact elements 88.

Also, as stated earlier, FIG. 9 is an exploded left end view of the rotatable connector housing 46 showing the circuit board 52 in dotted lines and the upper portion of the inner face of the rotor assembly 44 in full lines, while the upper cover portion 50 of the housing is raised above the base portion 48, and parts of the cover are broken away to show specific details.

FIG. 10 is a fragmentary exploded perspective view of a second modification of the present invention, where the first plurality of spring wire contact elements 88 is made integral with the second plurality of spring wire contact elements 90, and these new spring wire contact elements are identified by the numeral 156. Compare FIG. 4 with FIG. 10, and notice that the printed circuit elements 106 and 108 have been eliminated from the circuit board 52 of FIG. 10 due to the fact that the new spring wire contact elements 156 include the characteristics of the first plurality 88 of spring wire contacts and the second plurality of spring wire contacts 90. Very little has to be done to the circuit board 52 in order to accommodate these new spring wire contact elements 156. A series of shallow notches 158 would be formed in the edge of the board 52 opposite the earlier shallow notches 118 that were used for the second plurality of spring wire contact elements 90. Of course, these notches 158 are not aligned with the notches 118 in view of the nature of the opposite ends of the spring wire contact elements 156.

FIG. 11 shows a third modification of the present invention, and this Figure is a fragmentary front elevational view of the telephone set of FIG. 1, except it shows the rotatable electrical connector 28 built into the handset 16, where the coiled telephone cord 26 may be permanently attached to the rotor assembly 44 of the connector 28. This would be the preferred embodiment, when the connector is made integral with the handset, as in FIG. 11. Of course, another possibility would be to have the telephone cord 26 fitted with a standard male phone plug, such as element 38 in FIG. 2, to fit into a female socket (not shown) in the built-in rotatable connector 28 of FIG. 11.

This third modification of FIG. 11 is best seen in the fragmentary exploded view of FIG. 12, where the rotor assembly 44 is the same as in the previous modifications, except its outer end is connected to one end of a coiled telephone cord 26, as distinguished from the arrangement of FIG. 5 of the first modification of the invention where the outer end of the rotor assembly 44 is fitted with a standard male phone plug 34. This third modification of the connector 28 has a hollow insulated housing 160 that is split longitudinally from one end to the other, thereby forming a base portion 162 and a cover portion 164. This third modification of FIGS. 11 and 12 has a hollow housing 160 that is much shorter than the housing 46 of the early modifications because the circuit board 52 has been eliminated, and that includes the elimination of the central vertical post 132 as well as any support means for the circuit board as well as clamping means for holding the circuit board firmly in place in final assembly. This housing 160 has one end wall 166 with a central circular opening 168 which is split in two halves by the lower base portion 162 and the upper cover portion 164. This circular opening 168 is for receiving the rotor assembly 44 therein and serves as a bearing. On the interior side of the end wall 166 is a compartment 170, similar to compartment 148 of FIG. 4, for receiving the enlarged head 68 of the rotor assembly which includes the plurality of concentric electrical contact rings 74. The connector housing 160 includes a second end wall 172 which is likewise split into two halves by the longitudinal split of the housing.

The lower base portion 162 includes a plurality of spring wire contact elements 174, which are four in number, and they are related to the plurality of spring wire contact elements 88 of the first modification of this invention. One important difference is that these spring wire contact elements 174 have a fixed terminal end 176 which is encapsulated or molded into the base portion 162 at the time the base portion is formed, so that these spring contact elements 174 become a permanent part of the base portion 162. Moreover each spring wire contact element 174 has an external terminal end 178 which extends outwardly from the end wall 172 to be in a parallel array. Each external terminal 178 is shown fitted with a sleeve 180, which is hollow, for receiving a mating wire terminal or pin. This sleeve 180 could be crimped onto the wire terminal or pin for making a good electrical connection, as is well-known in this art. Notice that the free end of each spring wire contact element 174 has a smooth convex wiping surface 182 which is similar to the wiping surface 102 of the first plurality of spring wire contact elements 88 as shown in FIG. 4.

What this third modification of the rotatable electrical connector 28 is teaching is that the connector 28 need not have a removable connector means at each end, such as a standard male phone plug or a standard female socket for receiving such a male plug. The present invention can be modified by eliminating the circuit board 52 while retaining the present invention in its simplest form.

As in the early modifications, the upper cover portion 164 is provided with a series of parallel vertical slots 184, each for receiving the top portion of a separate spring wire contact element 174 so as to retain the contact element in place and stabilize it so as to increase its life expectancy and reliability. These vertical slots 184 are similar to the series of parallel vertical slots 149 in the cover portion 50, as seen in both FIGS. 5 and 9.

In all of the modifications of this invention that were explained above, the hollow insulated housing was described as a split housing. It will be understood by those skilled in the art that the split housing must be sealed together during use. Adhesives could be used, or a sonic welding technique, or a push-on or wraparound sleeve.

In the final assembly of the modifications of FIGS. 1–10, the rotor assembly 44 would be positioned in the base portion 48, then the circuit board 52 would be lowered onto the vertical post 132 so the spring wire contact elements 88 would be in contact with the plurality of concentric electrical contact rings 74. Then the cover portion 50 would be lowered onto the base portion and the split housing 46 sealed together.

Modifications of this invention will occur to those skilled in this art. Therefore, it is to be understood that this invention is not limited to the particular embodiments disclosed, but that it is intended to cover all modifications which are within the true spirit and scope of this invention as claimed.

What is claimed is:

1. A low friction rotatable electrical connector for use with coiled telephone cords, said connector comprising:
    a. a hollow insulated housing having a first plurality of electrical terminal means at one end, and a circular opening in the end wall at the opposite end of the housing;
    b. a rotor assembly of insulating material rotatably mounted within the said circular opening so the rotor assembly may rotate freely relative to the hollow housing, and a second plurality of electrical terminal means associated with the rotor assembly;
    c. the end of the rotor assembly within the housing having a transverse face supporting a plurality of concentric electrical contact rings that are spaced apart by insulating material, each contact ring being connected to a separate one of the second plurality of electrical terminal means;
    d. a plurality of spring wire contact elements each mounted at one end within the housing so the contacts are arranged in a parallel array, each spring wire contact element having a portion biased into continuous wiping contact with a separate one of said concentric rings for making a reliable electrical connection between the relatively movable hollow housing and its rotor assembly;
    e. each of said plurality of spring wire contact elements being of hairpin shape at its intermediate portion, the said housing having partitions interposed between the intermediate portions of the spring wire contact elements so as to stabilize and space these wire contact elements apart.

2. The invention as recited in claim 1 wherein the said hollow housing is split longitudinally from one end to the other thereby forming a base portion and a cover portion, said plurality of spring wire contact elements being mounted in one of the two base and cover portions, while the said partitions are formed in the opposite portion.

3. The invention as recited in claim 2 wherein each of said concentric contact rings on the inner transverse face of the rotor assembly is provided with a shallow continuous groove which serves as a recessed track for receiving and guiding the wiping contact surface of a separate one of the spring wire contact elements.

4. The invention as recited in claim 2 wherein the mounted end of each of the said plurality of spring wire contact elements is fixed directly to the base portion of the housing, and these mounted ends having terminal ends projecting outwardly of the adjacent end wall of the housing in a parallel array and serving as the said first plurality of electrical terminal means.

5. A low friction rotatable electrical connector for use with coiled telephone cords, said connector comprising:
   a. a hollow insulating housing having a first electrical terminal means at one end and a circular opening at the opposite end of the housing;
   b. a rotor assembly of insulating material rotatably mounted within the said circular opening so the rotor assembly may rotate freely relative to the hollow housing, and a second electrical terminal means formed adjacent the outer end of the rotor assembly that is outside the housing;
   c. the end of the rotor assembly within the housing having a transverse face supporting a plurality of concentric electrical contact rings, and insulated conductors joining these concentric rings with the said second electrical terminal means at the outer end of the rotor assembly;
   d. and a circuit board means mounted within the said hollow housing and having a circuit element for cooperation with each of said plurality of concentric rings of the rotor assembly, said circuit elements being joined at one end to the said first electrical terminal means, each circuit element at the other end being furnished with a first spring wire contact element that is biased into wiping contact with a separate one of said concentric rings for making a reliable electrical connection between the relatively movable hollow housing and its rotor assembly, the hollow housing including partition means to stabilize these spring wire contacts and bias them toward the concentric rings.

6. The invention as recited in claim 5 wherein the said hollow housing is split longitudinally from one end to the other thereby forming a base portion and a cover portion, one of said base and cover portions having a central vertical post, and the said circuit board means has a central opening which fits snugly over the said central post and is held thereby, and portions of the peripheral edge of the circuit board means being clamped between interior surfaces of both the base and cover portions so that the position of the circuit board means is fixed within the hollow housing.

7. The invention as recited in claim 6 wherein the said first electrical terminal means at one end of the hollow housing is a female socket built into that end of the housing that has an opening that is adapted to receive a standard male phone plug formed at one end of a coiled telephone cord, while the said second electrical terminal means is a standard male phone plug.

8. The invention as recited in claim 7 wherein the said female socket has a second plurality of parallel spring wire contact elements mounted to the adjacent end of the circuit board means at an inclined angle and extending longitudinally from the adjacent opening of the housing for making a wiping engagement with the plurality of contact elements of a standard male phone plug.

9. The invention as recited in claim 8 wherein the end of the circuit board means supporting the said plurality of parallel spring contact elements has an edge that is furnished with a plurality of notches for retaining and spacing these spring wire contact elements apart, while the said central post is furnished with a plurality of parallel slots, where each slot receives the free end of one of said female spring contact elements therein for retaining and spacing these spring contact ends apart.

10. The invention as recited in claim 9 wherein the said first plurality of spring wire contact elements is each fixed at one end to a circuit element at the adjacent end of the circuit board means, each first spring wire contact element being of hairpin shape at its intermediate portion which is braced against the said central transverse post, while the free end of each first spring wire contact element has a smooth convex surface in spring-biased wiping contact with a separate one of the concentric rings on the inner transverse face of the rotor assembly, the said housing having partitions interposed between the intermediate hairpin portions of these first spring wire contact means so as to retain and space these first spring wire contact elements apart, and limit means formed within the housing to limit the amount the rotor assembly may move into the hollow housing to protect the first spring wire contact elements from over-compression.

11. The invention as recited in claim 10 wherein the said rotor assembly has a thrust bearing surface which is biased against the innermost peripheral edge of the circular opening in which the rotor assembly is rotatably mounted by the said first spring wire contact elements so as to bias the rotor assembly away from the said internal limit means.

12. The invention as recited in claim 10 wherein each of said concentric contact rings on the inner transverse face of the rotor assembly is provided with a circular groove which serves as a track for receiving the smooth convex wiping surface of one of the first spring wire contact elements.

13. The invention as recited in claim 12 wherein there are four concentric electrical contact rings on the inner transverse face of the rotor assembly, and there are four of the first spring wire contact elements, each contact element being in wiping contact with only one of the contact rings, there being two of these first spring wire contact elements on opposite sides of the longitudinal centerline of the rotor assembly that constitutes the turning axis of the rotor assembly, while the wiping contact action between these concentric rings and these first spring wire contact elements takes place generally on an imaginary diametrical line that passes through the said longitudinal centerline to balance the spring forces exerted on the rotor assembly.

14. A low friction rotatable electrical connector for use with coiled telephone cords, said connector comprising:
   a. a hollow insulated housing having a first electrical female socket built into one end wall of the housing and having an opening that is adapted to receive a standard male phone plug therethrough;
   b. a rotor assembly of insulating material rotatably mounted within a circular opening in an opposite end wall of the housing so the rotor assembly may rotate freely relative to the connector housing, and a second electrical terminal means mounted on the outermost end of the rotor assembly;

c. the inner end of the rotor assembly within the housing having an enlarged head with a transverse end wall provided with a plurality of concentric electrical contact rings that are insulated from each other, and insulated conductors joining these concentric rings with the said second electrical terminal means;

d. and a circuit board means mounted within the said connector housing and having a first plurality of spring wire contact elements mounted adjacent the innermost edge of the circuit board in a generally parallel array adjacent the concentric rings, each first spring wire contact element being urged into continuous wiping contact with a separate one of said concentric rings;

e. the opposite edge of the circuit board supporting a second plurality of spring wire contact elements in a generally parallel array that is disposed at an inclined angle longitudinally of the female socket, each second spring wire contact element being adapted to be urged into contact with the said standard male phone plug, said circuit board means having separate circuit elements joining the fixed mounted ends of related pairs of first and second spring wire contact elements.

15. The invention as recited in claim 14 wherein the said hollow connector housing is provided with a first series of partitions to provide a spacer between a portion of adjacent spring wire contact elements of the said first plurality so as to retain these contact elements in place, said connector housing also having a second series of partitions to provide a spacer between a portion of adjacent spring wire contact elements of the said second plurality so as to retain these contact elements in place.

16. The invention as recited in claim 14 wherein the said circuit board means is of insulating material, and the said separate circuit elements are circuit elements that are printed on the circuit board means.

17. The invention as recited in claim 15 wherein the said connector housing is split longitudinally from one end to the other thereby forming a base portion and a cover portion, the base portion having a central vertical post, and the circuit board means has a central opening which fits snugly over the vertical post and is positioned in place thereby, the interior of both the base portion and the cover portion having clamping surfaces engaging portions of the peripheral edge of the circuit board means to hold the circuit board means fixed in place, the combined base and cover portions forming a compartment for receiving the said enlarged head of the rotor assembly therein, and limit means formed in cooperation with the said compartment to limit the amount of travel of the rotor assembly into the connector housing so as to protect the first plurality of spring wire contact elements from over-compression, the head of the rotor assembly having a thrust bearing surface on its outermost side which is biased by the said first plurality of contact elements against the innermost peripheral edge of the circular opening in which the rotor assembly is rotatably mounted, and sealing means joining the base and cover portions together.

18. The invention according to claims 1, 2 or 4 wherein the rotatable electrical connector is adapted to be built into the microphone end of a handset of a telephone set.

19. The invention as recited in any one of claims 5, 13, 14 or 17 wherein the rotatable electrical connector is adapted to be positioned at one end of a coiled telephone cord, while the opposite end of the connector is provided with a standard male phone plug that is adapted to be inserted in a mating socket in the handset of a telephone set.

20. The invention as recited in any one of claims 5, 13, 14 or 17 wherein the said rotatable electrical connector is fitted with a standard male phone plug that is adapted to be inserted into the base unit of a telephone set.

21. The invention as recited in any one of claims 5, 13, 14 or 17 wherein the rotatable electrical connector is interposed intermediate the length of a coiled telephone cord.

22. A low friction rotatable electrical connector for use with coiled telephone cords, said connector comprising:

a. a hollow insulated housing having a first plurality of electrical terminal means at one end, and a circular opening in the end wall at the opposite end of the housing;

b. a rotor assembly of insulating material rotatably mounted within the said circular opening so the rotor assembly may rotate freely relative to the hollow housing, and a second plurality of electrical terminal means associated with the rotor assembly;

c. the end of the rotor assembly within the housing having a transverse face supporting a plurality of concentric electrical contact rings that are spaced apart by insulating material, each contact ring being connected to a separate one of the second plurality of electrical terminal means, d. a plurality of spring contact elements mounted within the housing, and each contact element having a portion biased into continuous wiping contact with a separate one of said concentric rings for making a reliable electrical connection between the relatively movable hollow housing and its rotor assembly, each said spring contact element being joined with a separate one of the first plurality of electrical terminal means;

e. wherein the said hollow housing is split longitudinally from one end to the other thereby forming a base portion and a cover portion, said first plurality of electrical terminal means being mounted in the base portion, said first plurality of electrical terminal means also being located within a female socket built into that end of the housing that has an opening that is adapted to receive a standard male phone plug formed at one end of a coiled telephone cord, said second electrical terminal means formed adjacent the opposite end of the rotor assembly being a standard male phone plug.

* * * * *